United States Patent
Goergen et al.

(10) Patent No.: US 10,735,039 B1
(45) Date of Patent: Aug. 4, 2020

(54) REMOVAL OF CHANNEL IMPAIRMENTS DUE TO SKEW AND CHANNEL ASYMMETRY WITH A COMPOSITE FILTER

(71) Applicant: CISCO TECHNOLOGY, INC., San Jose, CA (US)

(72) Inventors: Joel Richard Goergen, Soulsbyville, CA (US); Mike Sapozhnikov, San Jose, CA (US); David Nozadze, San Jose, CA (US); Amendra Koul, San Francisco, CA (US); Upendranadh Reddy Kareti, Union City, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/593,239

(22) Filed: Oct. 4, 2019

(51) Int. Cl.
   *H04B 1/12* (2006.01)
   *H04L 25/03* (2006.01)
   *H04B 1/04* (2006.01)

(52) U.S. Cl.
   CPC ........... *H04B 1/123* (2013.01); *H04B 1/0475* (2013.01); *H04L 25/03828* (2013.01)

(58) Field of Classification Search
   CPC ...................................................... H04B 1/123
   See application file for complete search history.

(56) References Cited

U.S. PATENT DOCUMENTS

| | | | |
|---|---|---|---|
| 4,759,625 A * | 7/1988 | Caponi | G01M 11/33 356/73.1 |
| 7,522,658 B2 | 4/2009 | Jensen | |
| 10,103,921 B2 | 10/2018 | Jungnickel | |
| 10,171,200 B2 | 1/2019 | Yu | |
| 2008/0240266 A1 * | 10/2008 | Tinsley | H04W 52/42 375/260 |
| 2019/0081823 A1 | 3/2019 | Alic | |

FOREIGN PATENT DOCUMENTS

WO   2018109518 A1   6/2018

OTHER PUBLICATIONS

Amendra Koul, K. Nalla, D. Nozadze, M. Sapozhnikov, Y. Yang, "Fiber weave effect: Modeling, measurements, challenges and its impact on differential insertion loss for weak and strong-coupled differential transmission lines", presented at DesignCon 2018, Santa Clara.

David Nozadze, Amendra Koul, K. Nalla, M.Sapozhinikov, V. Khilkevich, "Effective channel budgeting technique for high-speed channels due to differential P/N skew", accepted for presentation at IEEE EMC SI/PI conference Aug. 7-11, 2017. https://ieeexplore.ieee.org/stamp/stamp.jsp?tp=&arnumber=8329757.

https://www.signalintegrityjournal.com/ext/resources/White-papers-App-notes/4119_DC10_Glass_Weave_Losses_SUN_v11.pdf.

http://www.harting-usa.com/fileadmin/harting/documents/public/40GBWhitePaper_01.pdf.

* cited by examiner

*Primary Examiner* — Hsinchun Liao
(74) *Attorney, Agent, or Firm* — Cindy Kaplan

(57) ABSTRACT

In one embodiment, a transmission system includes a transmitter, a receiver, and a filter operable at one of the transmitter and the receiver to remove channel impairments. The filter is operable according to a sum of a Gaussian function and a reciprocal of cosine function, wherein the Gaussian and reciprocal of cosine functions comprise tunable parameters to account for skew and channel asymmetry.

20 Claims, 11 Drawing Sheets

REMOVAL OF CHANNEL IMPAIRMENTS DUE TO SKEW AND CHANNEL ASYMMETRY WITH A COMPOSITE FILTER

TECHNICAL FIELD

The present disclosure relates generally to communication networks, and more particularly, to removing channel impairments.

BACKGROUND

Channel impairments may lead to artifacts on the channel response of a differential signal, especially the channel insertion loss that acts as a transfer function for how the channel behaves to a signal passing through it with respect to frequency. As speeds increase, small impairments in the channel may cause sensitivity in the response and loss margin impact on the link may go up rapidly, therefore impacting link performance.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
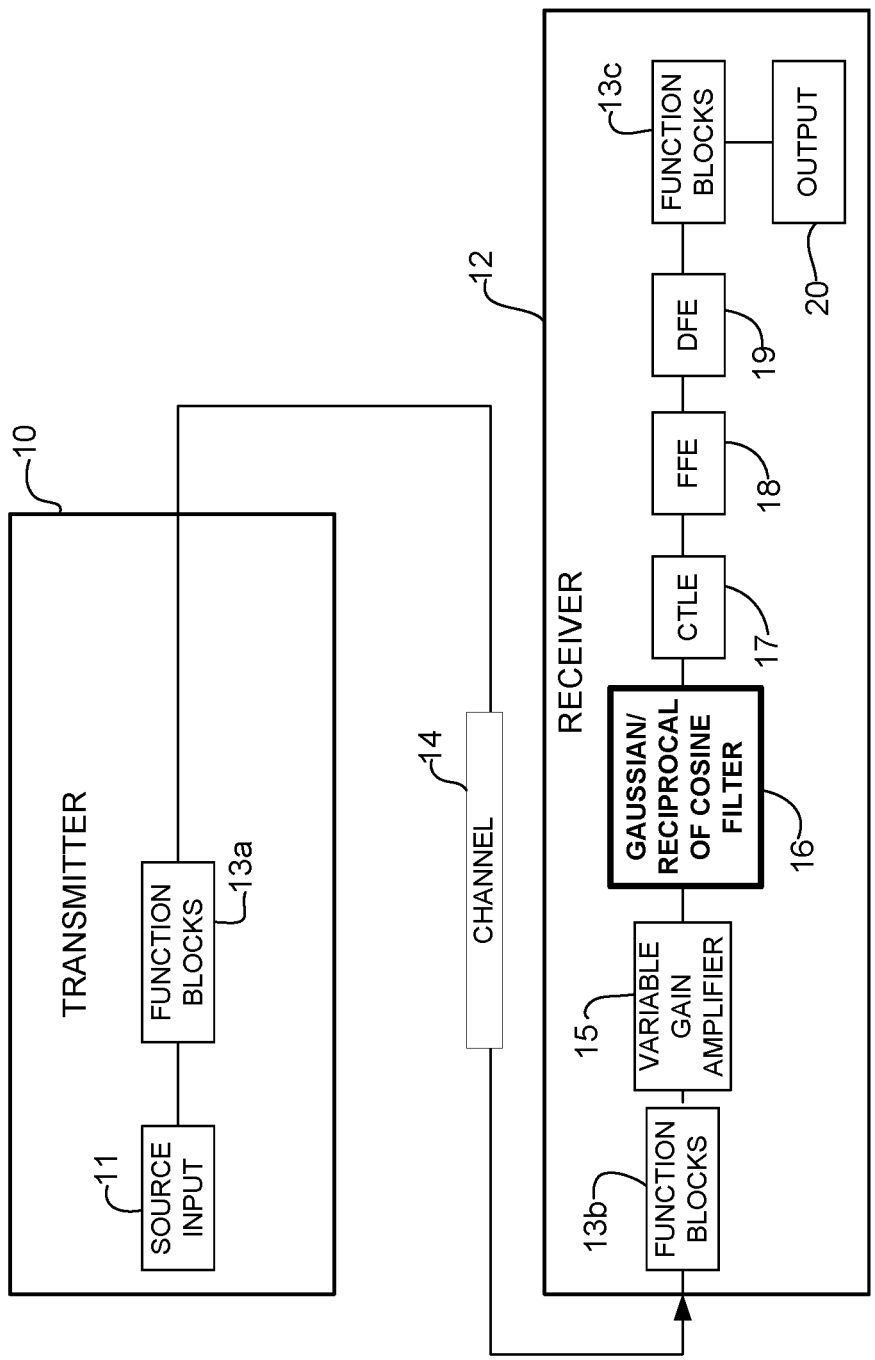
FIG. 1 is a simplified schematic of a transmission system comprising a filter for removal of channel impairments in accordance with one embodiment.

In one embodiment, a transmission system generally comprises a transmitter, a receiver, and a filter operable at one of the transmitter and the receiver to remove channel impairments. The filter is operable according to a sum of a Gaussian function and a reciprocal of cosine function, wherein the Gaussian and reciprocal of cosine functions comprise tunable parameters to account for skew and channel asymmetry.

In one or more embodiments, the skew comprises time delay skew, rise and fall time skew, and amplitude skew.

In one or more embodiments, the filter comprises a band pass filter with shaping for use in equalization.

In one or more embodiments, the tunable parameters comprise frequency, a Gaussian variable, a standard deviation variable, and a skew variable.

In one or more embodiments, at least some of the tunable parameters may be defined based on an impulse response at the receiver.

In one or more embodiments, the filter operates at the receiver.

In one or more embodiments, the filter operates at the transmitter.

In one or more embodiments, the transmission system operates in a pulse amplitude modulation serializer/deserializer and the transmission system further comprises a continuous time linear equalizer.

In another embodiment, a method generally comprises receiving at a receiver, a transmission signal from a transmitter, filtering the data with a composite Gaussian and reciprocal of cosine filter to remove channel impairments, and tuning tunable parameters of the composite Gaussian and reciprocal of cosine filter to account for skew.

In yet another embodiment, a method generally comprises receiving transmission data at a transmitter, filtering the transmission data with a composite Gaussian and reciprocal of cosine filter to remove channel impairments, tuning tunable parameters of the composite Gaussian and reciprocal of cosine filter to account for skew, generating a transmission signal, and transmitting the transmission signal to a receiver.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Channel impairments may lead to artifacts on the channel response of a differential signal, especially the channel insertion loss that acts as a transfer function for how the channel behaves to a signal passing through it with respect to frequency. Effects such as skew cause an increase in channel loss as skew increases. Periodic loading effects can also be seen from any asymmetry in the transmission line between the P (positive trace) and N (negative trace) signals of the differential pair. Periodic loading effects due to channel impairments have also been shown to impact insertion loss. Other reflections and channel impairments create insertion loss deviation in the channel that may result in eye closure height (vertical opening of eye diagram) and width (horizontal opening of eye diagram). As data rates continue to increase, small impairments in the channel can cause sensitivity in the response and hence eye and margin impact on the link also increase. For example, eye height closes very fast as asymmetry increases. Asymmetry created by high skew has an effect on width and height of the impulse response and therefore transfer function of the channel. Many of these effects result from anisotropy of the printed circuit board material and cable structures and may be random and uncontrolled, thus making corrections for application on the physical layout difficult.

An increase in skew results in an increase in insertion loss at various data rates and also impacts mode conversion. Thus, asymmetry is related to loss and mode conversion. With this knowledge, it may be possible to buy back margin that is being lost in terms of eye height (loss) and eye width (jitter-skew to eye width impact) that becomes more sensitive at higher signaling speeds (e.g., >56 Gbps).

The embodiments described herein provide for removal (e.g., reduction, partial removal, full removal) of channel impairments through the use of a filter (also referred to herein as a behavioral filter or composite filter). The filter is added to remove channel impairments, thereby allowing for more robust equalization. As described in detail below, P/N mismatch may be compensated with linear filtering and the embodiments may be implemented to address one or more channel asymmetry cases (e.g., time delay skew, rise/fall time skew, amplitude skew, or any combination thereof). In one or more embodiments, a transfer function represented by Gaussian and reciprocal of cosine functions is used to compensate for losses resulting from P/N mismatch. In one example, a matching filter (band pass filter with shaping) may be used to equalize the 'suck out' caused by inherent asymmetry. One or more of the embodiments described herein provide a filter that reduces channel impairment without increasing mode conversions or creating severe PVT (Process, Voltage, Temperature) variation impact.

FIG. 1 illustrates a simplified transmission system (Tx-Rx link) with a transmitter 10 and a receiver 12 for transmitting a transmission signal through a transmission channel 14, in accordance with one embodiment. In order to remove channel impairment due to skew, an active circuit comprising a tunable filter (also referred to therein as a behavioral filter, composite filter, matching filter, or composite Gaussian and reciprocal of cosine filter) 16 may be added to the transmission system. The transmitter 10 comprises a source input 11 and one or more function blocks 13a, which may perform any number of functions (e.g., encoding, modulation, pulse shaping, filtering, mapping, etc.). The receiver 12 may also include one or more function blocks 13b, 13c configured to perform various functions (e.g., decoding, demodulation, etc.) either before or after the filter 16, and an output 20. In the example shown in in FIG. 1, the receiver 12 further comprises a variable gain amplifier 15, continuous time linear equalizer (CTLE) 17, feed forward equalizer (FFE) 18, and decision feedback equalizer (DFE) 19.

It is to be understood that the simplified block diagram shown in FIG. 1 is only an example and the embodiments described herein may be implemented in transmission systems comprising different components or arrangement of components. For example, FIG. 1 shows the filter 16 implemented in the receiver, the filter may also be implemented at the transmitter.

The filter 16 uses a sum of Gaussian and cosine functions (e.g., sum of Gaussian function and reciprocal of cosine function) and has tunable parameters to create a channel response that has less insertion loss deviation (ILD). The following is one example of a transfer function (T) for the filter 16 that is a function of frequency (f) with n-number of Gaussian functions with tunable parameters $f_i^o$, $\mu_i$, $\sigma_i$, and $t_{skew}$:

$$T = \sum_{i=1}^{n} \frac{1}{\sqrt{2\pi\mu_i}} e^{-\frac{1}{2}\left(\frac{f-f_i^0}{\sigma_i}\right)^2} + \frac{1}{|\cos(\pi t_{skew} f)|} \quad \text{(Equation 1)}$$

Where:
f is frequency;
$f_i^o$ is a tunable frequency parameter;
$\sigma_i$ is a tunable Gaussian variable;
$\mu_i$ is a tunable standard deviation variable of Gaussian function; and
$t_{skew}$ is a tunable skew parameter.

One example of a method for tuning filter response to get an input tunable parameter $t_{skew}$ value for the reciprocal of cosine function is described below with respect to FIGS. 8A and 8B. An example of a tuning algorithm for finding tunable parameter values to reduce bit error rates in SerDes is described below with respect to FIGS. 9A and 9B.

Figure 2:
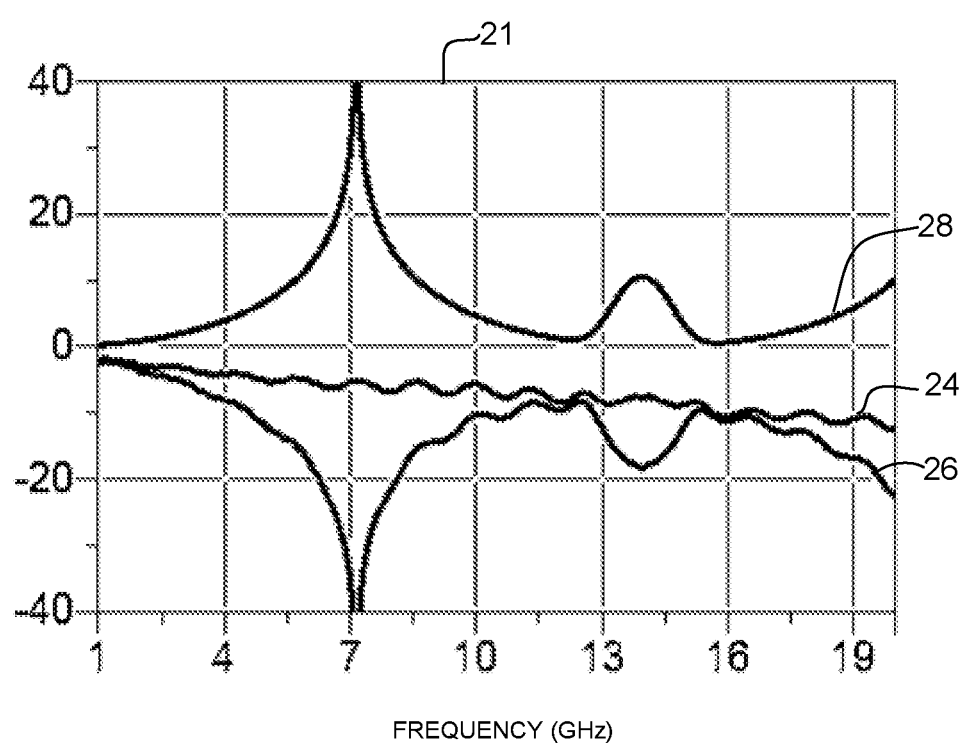
FIG. 2 illustrates an example of channel response with and without the filter of FIG. 1.

FIG. 2 shows a graph 21 illustrating an example of insertion loss versus frequency with the filter 16 installed (trace 24) and without the filter installed (trace 26) (FIGS. 1 and 2). Trace 28 shows the filter response. When the filter 16 is not installed, channel response 26 is detrimental to achieving a good quality eye, as previously described. As shown in the channel response 24 and described below, the tunable composite filter 16 may be tuned with amplitude corrections at variable frequency points, thereby providing an improved corrected response. In one or more embodiments, the filter 16 is a behavioral filter that works based on tunable parameters to generate an improved channel response with effects that can be seen in terms of bought back margin with respect to BER (Bit Error Rate) or eye height and width for both NRZ (Non-Return-to-Zero) and PAM4 (four-level Pulse Amplitude Modulation) signaling techniques, for example.

Figure 3A:
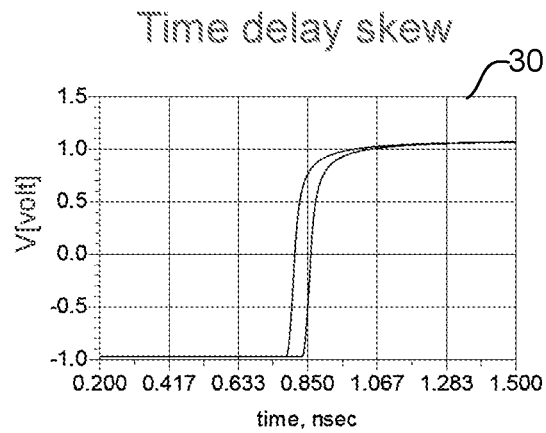
FIG. 3A illustrates an example of time delay P/N skew in a stripline transmission line in a printed circuit board, showing one type of channel impairment that may be removed by the filter in the transmission system of FIG. 1.
Figure 3B:
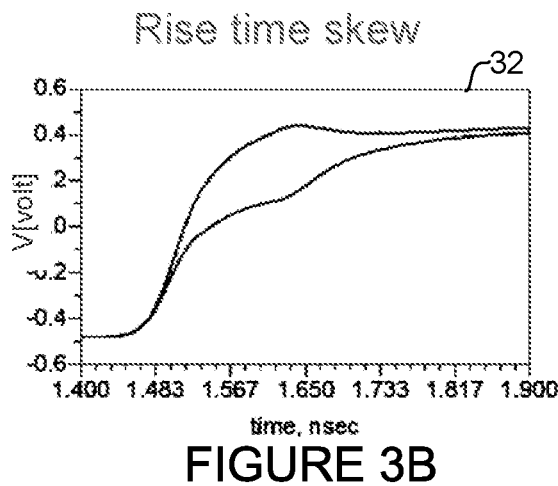
FIG. 3B illustrates an example of rise time P/N skew in a microstrip transmission line in a printed circuit board, showing another type of channel impairment that may be removed by the filter in the transmission system of FIG. 1.
Figure 3C:
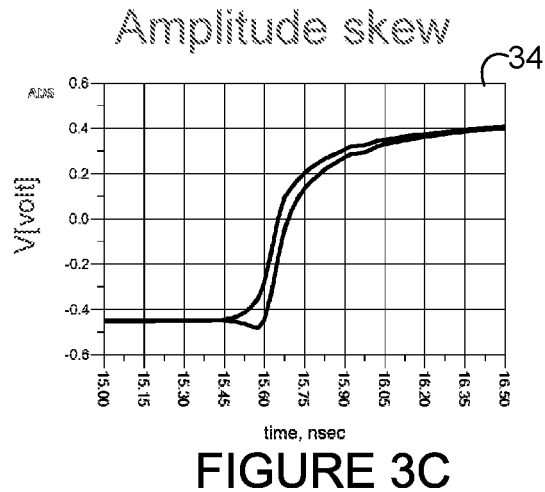
FIG. 3C illustrates an example of amplitude skew in a cable, showing another type of channel impairment that may be removed by the filter in the transmission system of FIG. 1.

FIGS. 3A-3C illustrate effects of channel asymmetry resulting in different types of P/N skew, for which the filter 16 may be used to address. Graphs 30, 32, 34 show voltage versus time for different skew conditions for P/N of a differential signal. The graph 30 of FIG. 3A illustrates time delay skew when differential mode and common mode speeds are the same. This typically occurs in stripline transmission lines in PCBs (Printed Circuit Boards). The graph 32 of FIG. 3B illustrates rise time skew occurring when differential mode travels faster than common mode. This typically occurs in microstrip transmission lines in PCBs. The graph of FIG. 3C illustrates an example of amplitude skew when common mode travels faster than differential mode. This is typically present in cables. Channel impairments resulting from skew degrade high-speed signal quality at a receiver of SerDes (Serializer/Deserializer), for example. These asymmetry and channel impairments are corrected (e.g., removed, minimized, reduced) using the composite filter 16 described herein. In one or more embodiments, the filter 16 specifically addresses these three different channel asymmetry cases; time delay skew, rise/fall time skew, and amplitude skew.

Figure 4A:
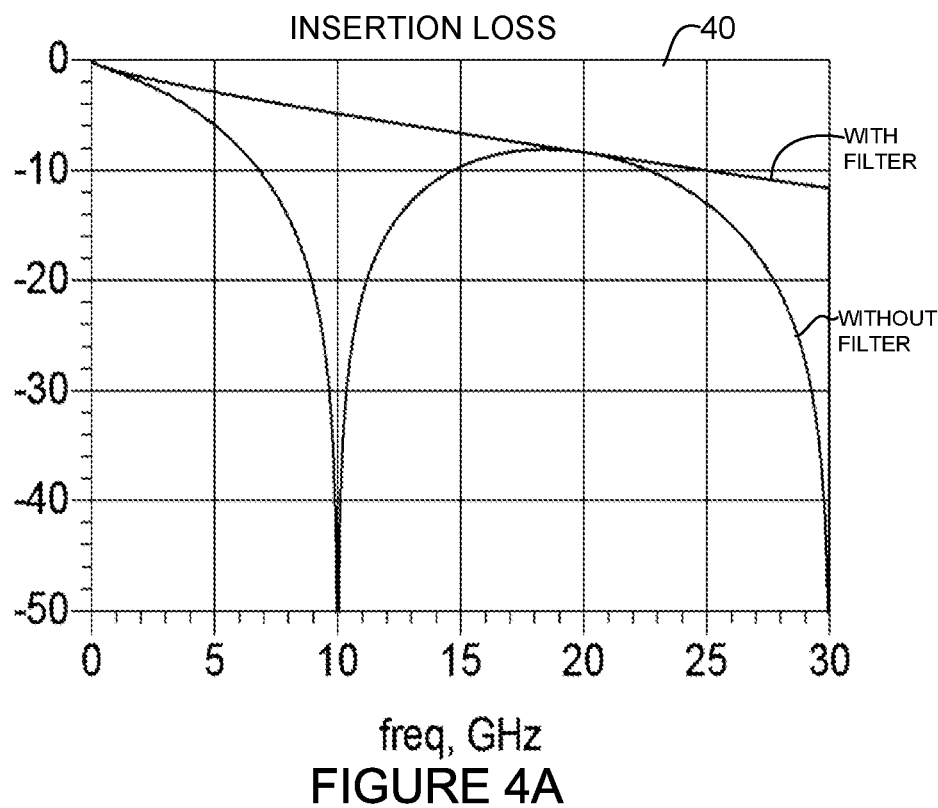
FIG. 4A illustrates an example of insertion loss in the stripline transmission line with and without the filter of FIG. 1.
Figure 4B:
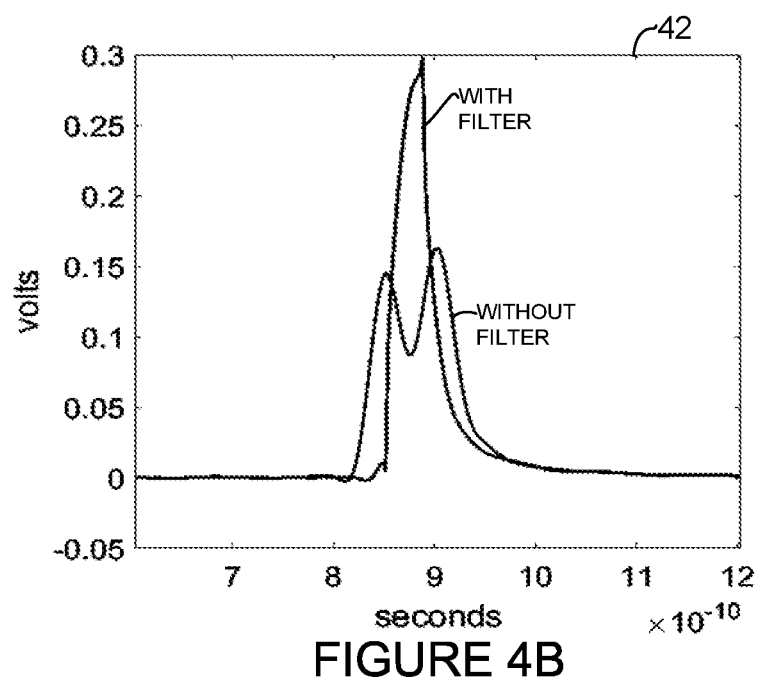
FIG. 4B illustrates an example pulse response in the stripline transmission line with and without the filter of FIG. 1.

FIGS. 4A and 4B illustrate an example of a stripline simulation with 50 ps skew. Insertion loss versus frequency is shown in graph 40 of FIG. 4A and pulse response (voltage versus time) is shown in graph 42 of FIG. 4B. Conventional receiver equalization architectures are generally not able to address impact on pulse response. The pulse response without the filter 16 shown in FIG. 4B therefore cannot be equalized. It may be noted that the reciprocal of cosine part of the filter function provides the improvement shown in FIGS. 4A and 4B.

Figure 5A:
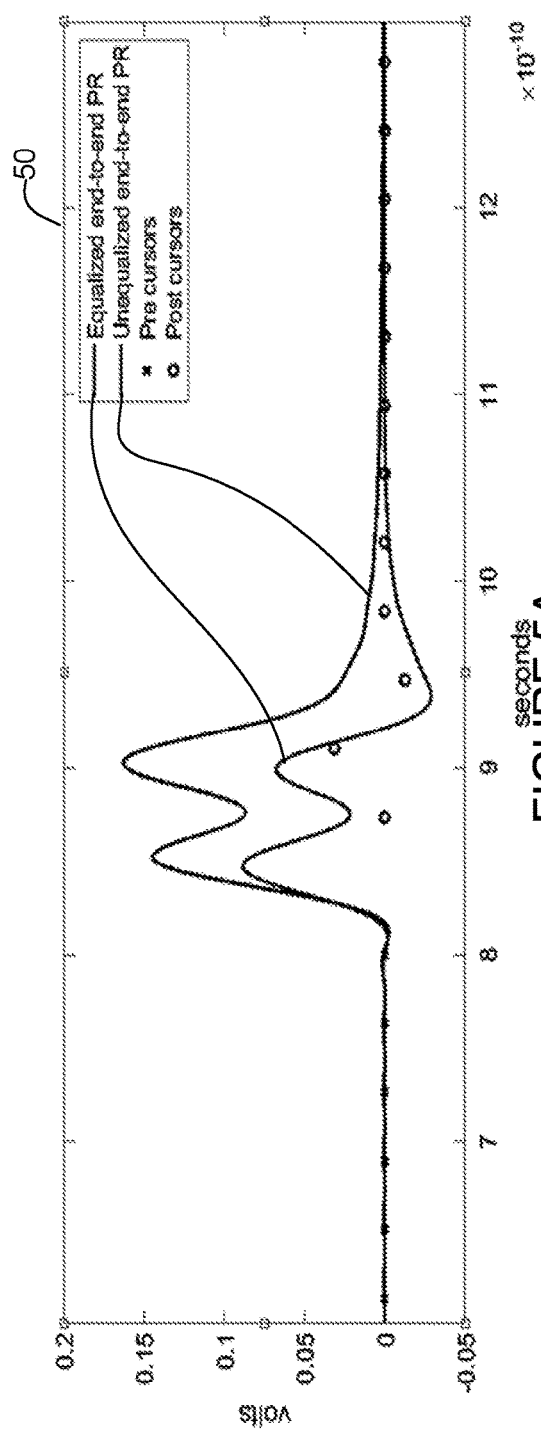
FIG. 5A illustrates equalized and un-equalized pulse response without the filter for the stripline case.
Figure 5B:
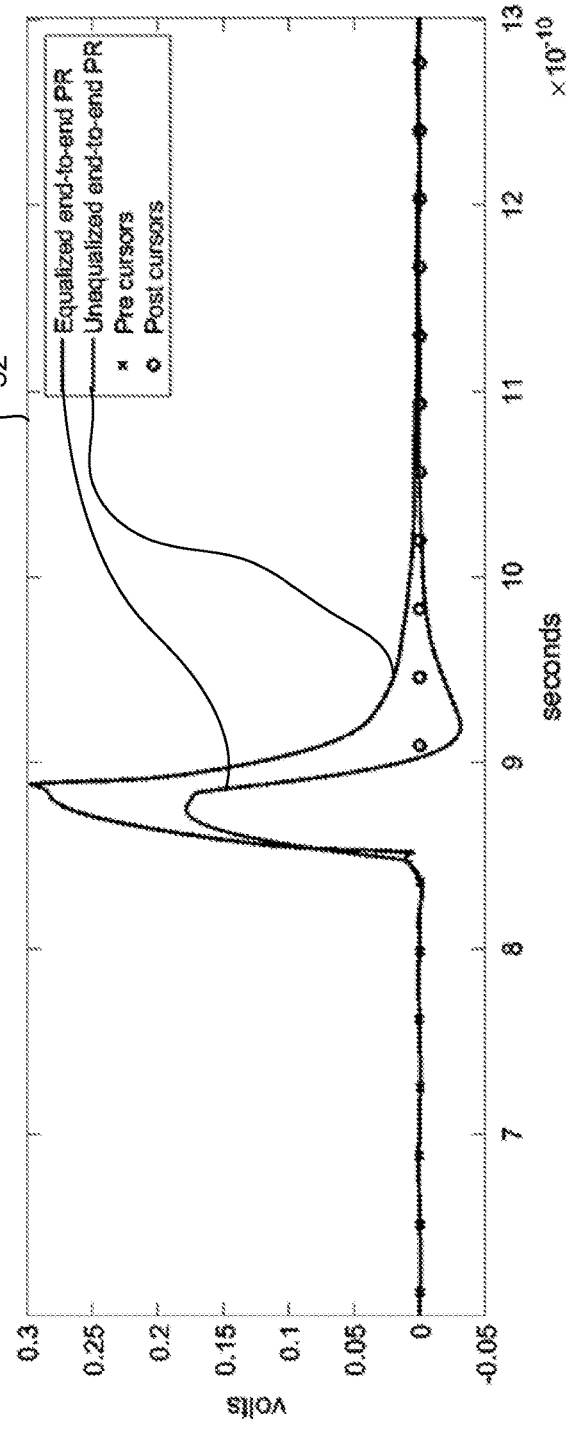
FIG. 5B illustrates equalized and un-equalized pulse response with the filter for the stripline case.

FIGS. 5A and 5B show graphs 50, 52 of voltage versus time for equalized and unequalized main tap voltage utilizing only CTLE (graph 50 in FIG. 5A) and utilizing both the filter 16 and CTLE (graph 52 in FIG. 5B) for the stripline simulation shown in FIGS. 4A and 4B. With only CTLE, the equalized main tap voltage is 0.09 volts. With the filter 16, the equalized main tap voltage is 0.2 volts. As is shown in the graphs 50, 52, use of both the filter 16 and CTLE provides improved equalization. It may be noted that the reciprocal of cosine function part of the filter provides the improvement shown in FIGS. 5A and 5B.

Figure 6A:
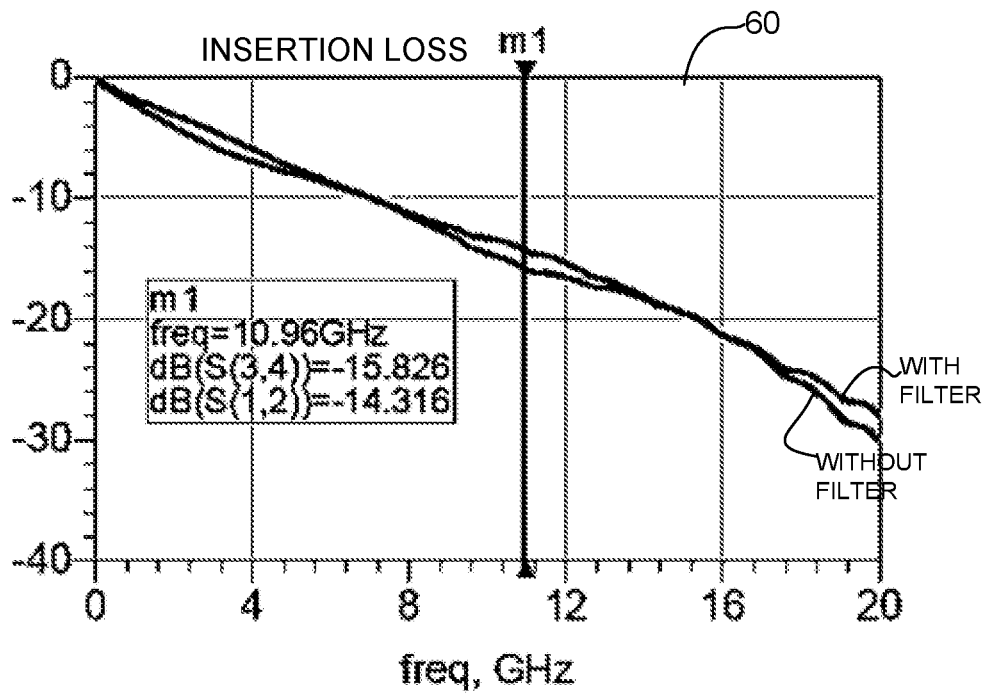
FIG. 6A illustrates an example of insertion loss in the microstrip transmission line with and without the filter.
Figure 6B:
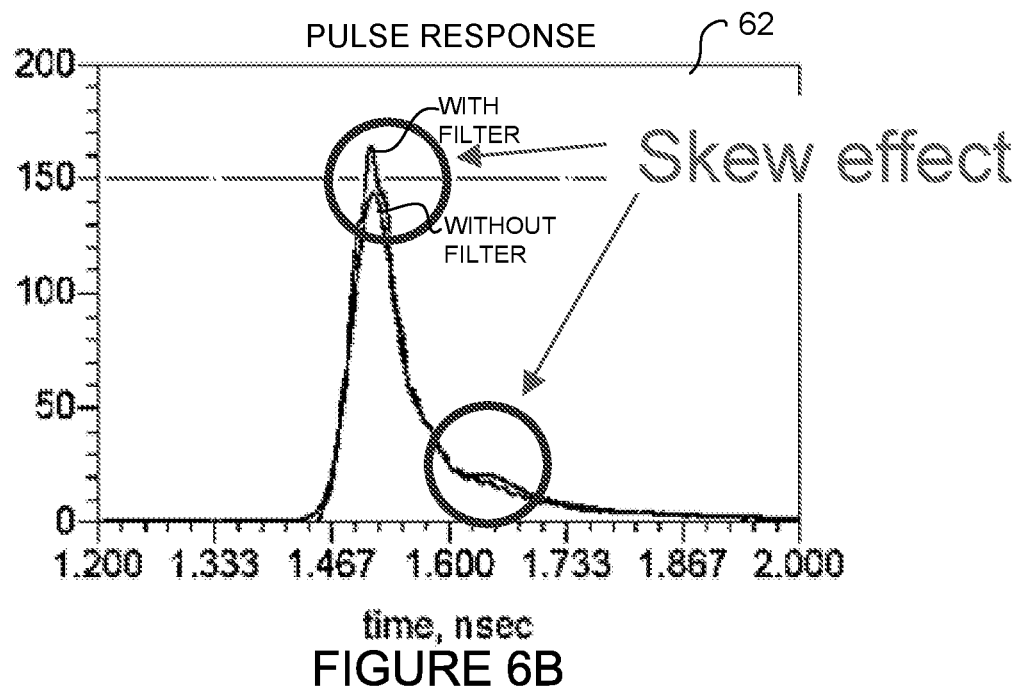
FIG. 6B illustrates an example pulse response in the microstrip transmission line with and without the filter of FIG. 1.

FIGS. 6A and 6B illustrate an example of a microstrip simulation with 60 ps skew. Graph 60 shows insertion loss versus frequency and graph 62 shows pulse response (voltage versus time), with and without the filter 16. The skew effect is shown in FIG. 6B. The skew in the microstrip transmission line results in ILD type of behavior and the filter 16 (e.g., Gaussian function of filter) addresses this impact on pulse response, as shown in FIG. 6B.

Figure 7A:
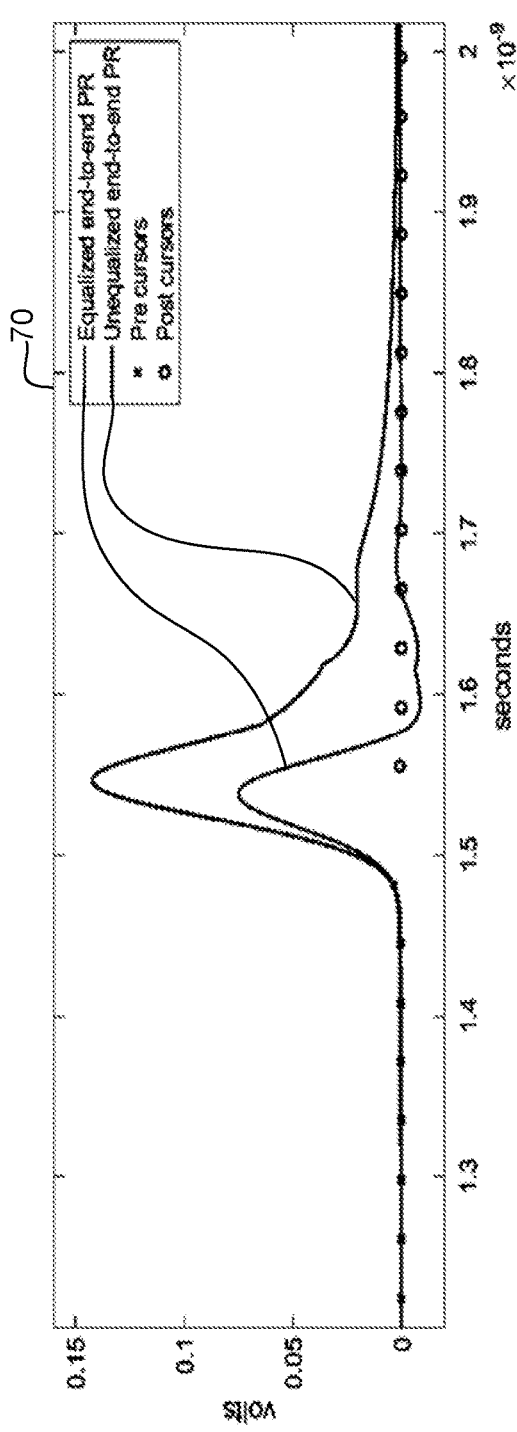
FIG. 7A illustrates equalization for the microstrip with skew simulation shown in FIGS. 6A and 6B without the filter.
Figure 7B:
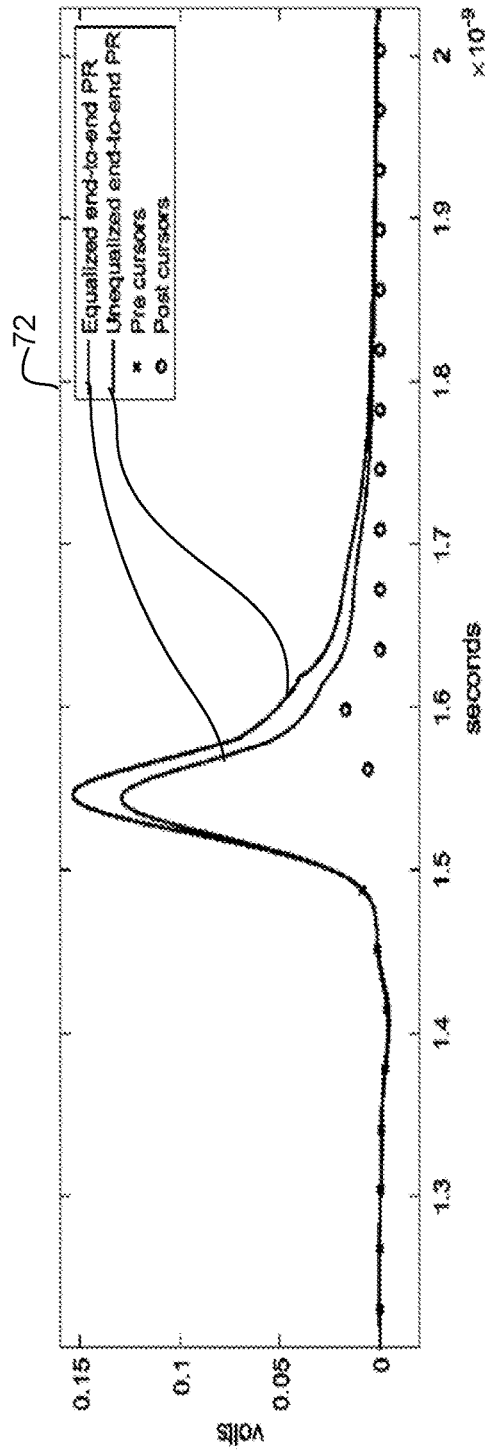
FIG. 7B illustrates equalization for the microstrip with skew simulation shown in FIGS. 6A and 6B with the filter of FIG. 1.

FIG. 7A shows graphs 70, 72 of voltage versus time for equalized and unequalized main tap voltage utilizing only CTLE (graph 70 in FIG. 7A) and utilizing both the filter 16 and CTLE (graph 72 in FIG. 7B) for the microstrip simulation shown in FIGS. 6A and 6B. The equalized main curser voltage with only CTLE is 0.075 volts. With the filter 16 and CTLE, the equalized main curser voltage is 0.125 volts. As shown in the graphs 70, 72, use of both the filter 16 and CTLE provides improved equalization. In this example, the filter 16 provides a sixty percent improvement in main curser amplitude.

Amplitude skew shown in FIG. 3C (skew in cables) results in ILD type of behavior. This may also be addressed similar to described above with the filter 16 for the microstrip simulation.

Figure 8A:
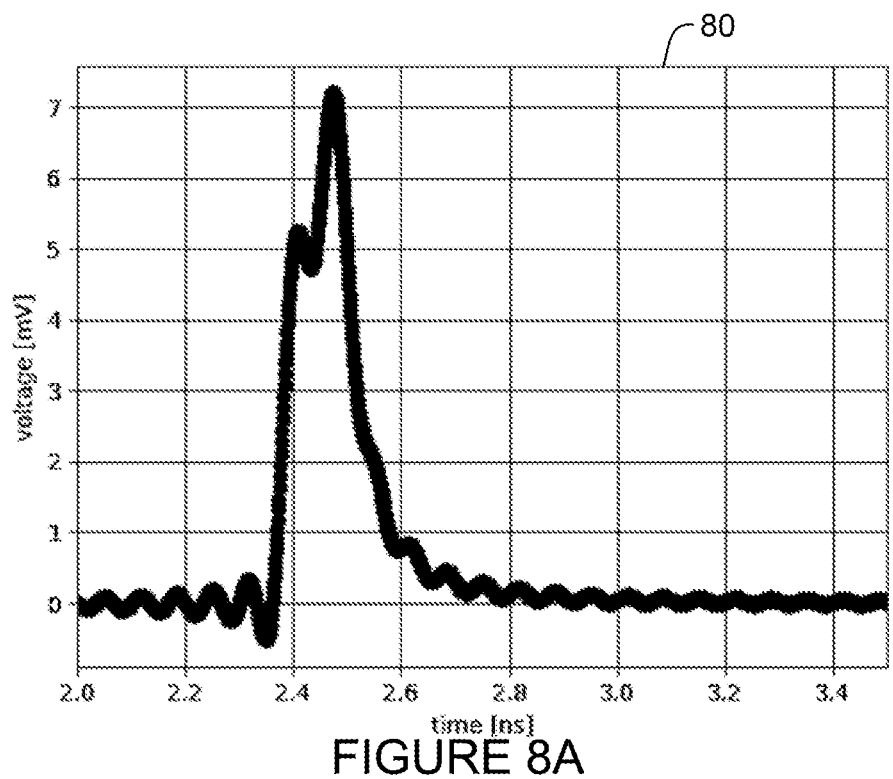
FIG. 8A illustrates an example of an impulse response that can be used to tune the filter of FIG. 1.
Figure 8B:
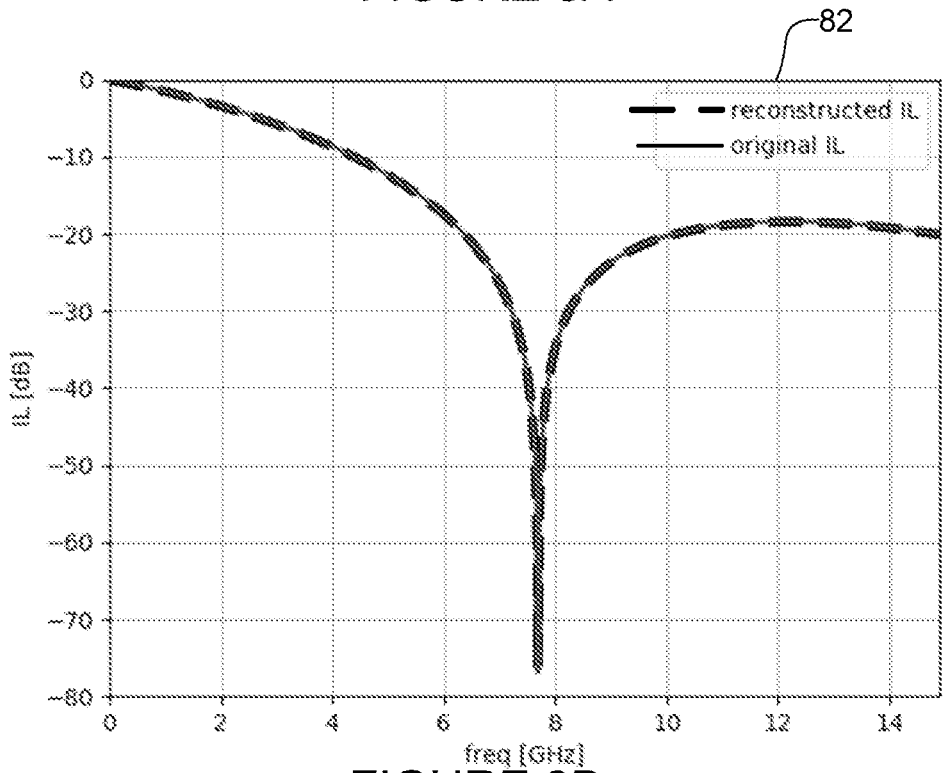
FIG. 8B illustrates a comparison of simulated channel insertion loss and channel insertion loss reconstructed from the impulse response of FIG. 8A.

FIGS. 8A and 8B illustrate an example for identifying 'dip' frequency in channel insertion loss (IL) and time delay skew using impulse response. This may be used to obtain $t_{skew}$ (tunable parameter for reciprocal of cosine function described above) for use in tuning filter response. The impulse response may be obtained from a dump from SerDes receivers, for example. FIG. 8A (graph 80) shows an example simulation of impulse response (voltage versus time) of a channel with a 65 ps time delay skew.

FIG. 8B (graph 82) shows a transform (using FFT) of impulse response to channel insertion loss for use in skew calculation. The graph 82 shows insertion loss (IL) versus frequency for original IL and reconstructed IL. The dotted line represents channel IL reconstructed from impulse response. In the example shown in FIG. 8B, the skew may be calculated using dip frequency $f_{skew}$=7.7 Ghz:

$t_{skew}=1/(2*f_{skew})=65$ ps;

which matches the value of skew in the channel. The process may be validated by plotting insertion loss of channel (solid line) and comparing with reconstructed insertion loss, which matches well as shown in FIG. 8B.

The following describes one example of a tuning algorithm for finding tunable parameter values to reduce BER (Bit Error Rate) (e.g., provide lowest BER) in a SerDes. In one example, initial values for the tunable parameters of Equation (1) above are set to provide a filter function of T≈1 (no gain or attenuation):

n=10
$f_i^o$=0
$\mu_i$=1e9
$\sigma_i$=1e20
$t_{skew}$=0

At the SerDes receiver, an impulse response FFT is identified to obtain transfer function (insertion loss). Fitted insertion loss and insertion loss deviation function of obtained insertion loss may be found, for example, utilizing a method described in IEEE 802.bj, clause 93A.

Figure 9A:
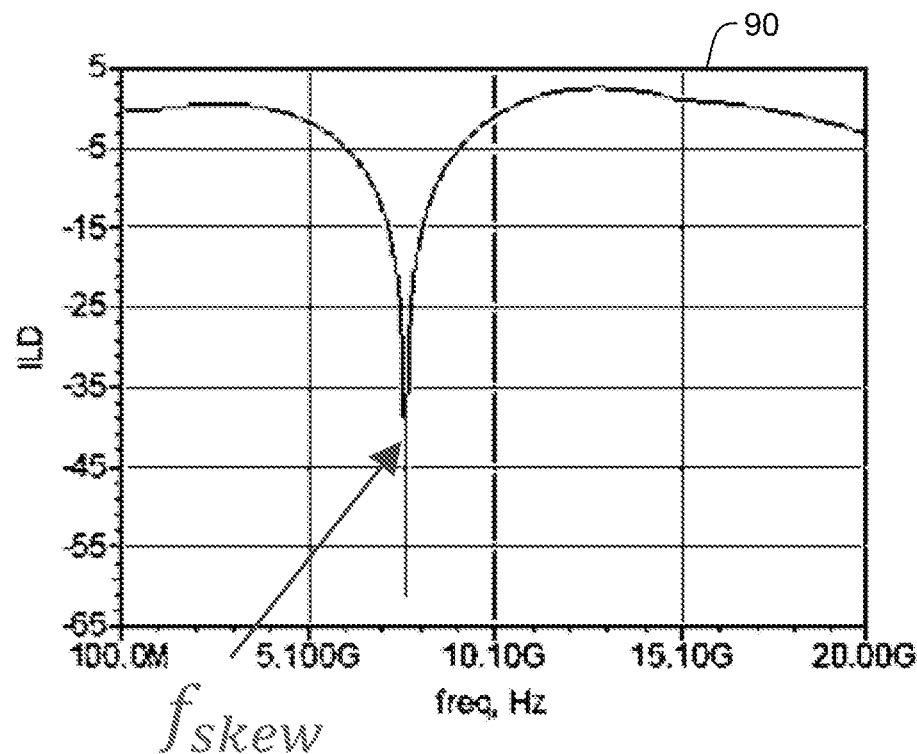
FIG. 9A illustrates an example of insertion loss deviation for insertion loss corresponding to FIG. 8B, for use in identifying a tunable parameter value, in accordance with one embodiment.

FIG. 9A shows a graph 90 illustrating an example of ILD for insertion loss corresponding to FIG. 8B. The sharp dip in insertion loss (e.g., ILD<−20 dB) may be identified as shown in FIG. 9A and the corresponding frequency recorded. The parameter $t_{skew}$ may then be calculated according to:

$t_{skew}=1/(2*f_{skew})$

Figure 9B:
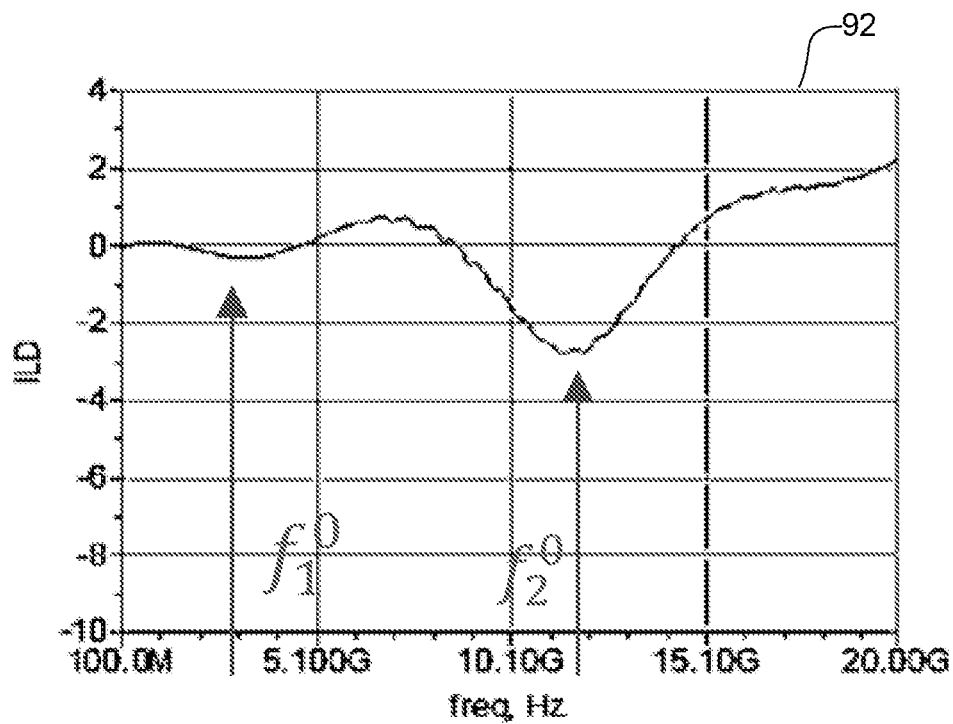
FIG. 9B illustrates an example of insertion loss deviation for insertion loss corresponding to FIG. 6A without the filter, for use in identifying tunable parameter values, in accordance with one embodiment.

FIG. 9B shows a graph 92 illustrating an example of ILD for insertion loss corresponding to FIG. 6A (without filter). This graph may be used to determine if there are regions in insertion loss curve in which ILD is less than −0.2 dB, for example. Then n in Gaussian filter equation may be defined as the number of such regions. In this example, n=2. Function F is fit to these regions to find seed values for $f_i^o$, $\mu_i$, $\sigma_i$, where F may be defined as:

$$F = -\sum_{i=1}^{n} \frac{1}{\sqrt{2\pi}\mu_i} e^{-\frac{1}{2}\left(\frac{f-f_i^0}{\sigma_i}\right)^2}$$

In one example, the final tuning step may include sweeping $f_i^o$, $\mu_i$, $\sigma_i$, and $t_{skew}$ within +/−20% in steps of 5% and monitoring BER values. Final values of tuning parameters will be the ones resulting in lowest BER.

It is to be understood that the tuning processes described above are only examples and other processes may be used to obtain the tunable parameter values, without departing from the scope of the embodiments.

Figure 10A:
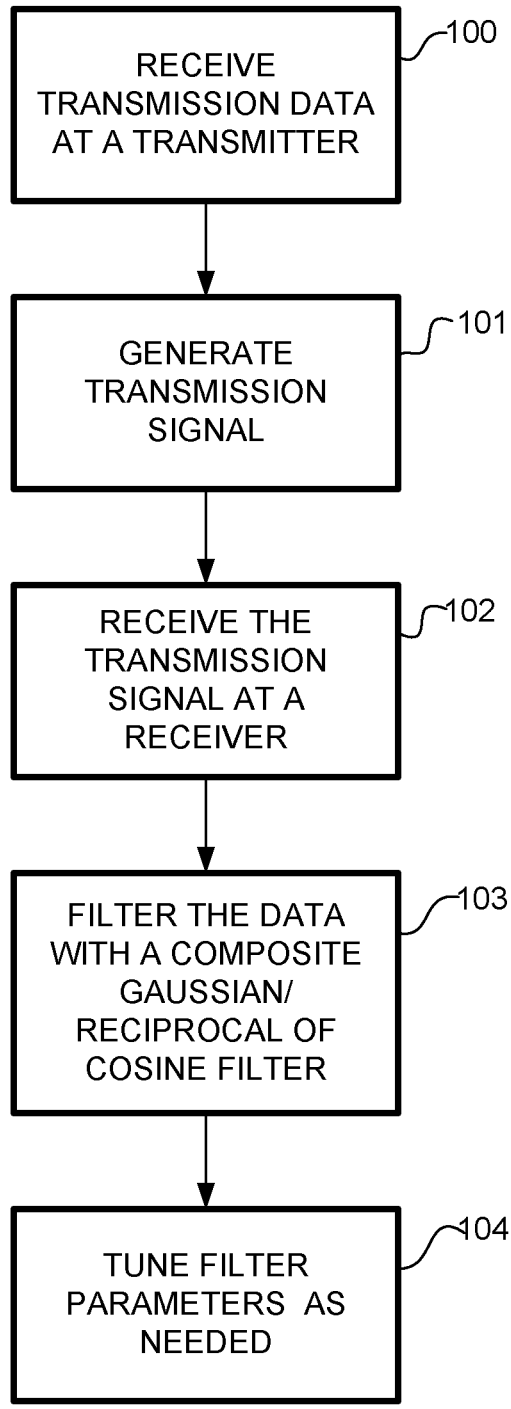
FIG. 10A is a flowchart illustrating an example of a process for removing channel impairments with the filter implemented at a receiver, in accordance with one embodiment.

FIG. 10A illustrates a process for removing channel impairments due to skew using the composite filter 16 at the receiver 12 (as shown in FIG. 1), in accordance with one embodiment. At step 100, the transmitter 10 receives transmission data (FIGS. 1 and 10A). The transmitter generates a transmission signal (step 101) and the receiver 12 receives the transmission signal (step 102). The data is filtered with the composite Gaussian and reciprocal of cosine filter (sum of Gaussian function and reciprocal of cosine function filter) 16 (step 103). As previously described, parameters of the filter function may be tuned as needed (step 104).

Figure 10B:
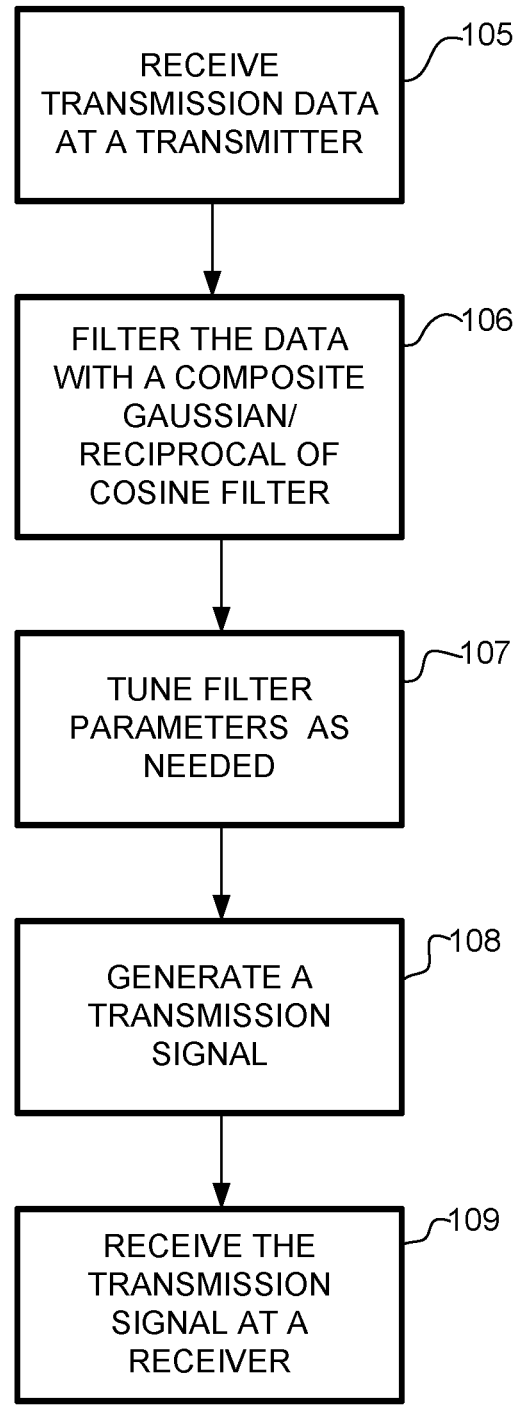
FIG. 10B is a flowchart illustrating an example of a process for removing channel impairments with the filter implemented at a transmitter, in accordance with one embodiment.

FIG. 10B illustrates a process for removing channel impairments due to skew using the composite filter at a transmitter, in accordance with one embodiment. Transmission data is received at the transmitter (step 105). The data is filtered with the composite Gaussian and reciprocal of cosine filter 16 (step 106). The filter parameters may be tuned as needed (step 107). The transmitter generates a transmission signal (step 108) and the receiver receives the transmission signal (step 109).

It is to be understood that the processes shown in FIGS. 10A and 10B are only examples and steps may be added, removed, reordered, combined, or modified, without departing from the scope of the embodiments.

As described above with respect to FIGS. 1, 10A, and 10B, the embodiments may be implemented in a transceiver or receiver in a transmission line (transmission system). The embodiments may be implemented using DSP (Digital Signal Processing) or as an analog implementation, which may need a larger die area and result in increased cost, or mixed logic and analog. In one example, the embodiments may be implemented for use with PAM4 SerDes.

The embodiments may be implemented, for example, in a network device within a data communications network. The network may include any number of network devices in communication via any number of nodes (e.g., routers, switches, gateways, controllers, edge devices, access devices, aggregation devices, core nodes, intermediate nodes, or other network devices), which facilitate passage of data within the network.

Figure 11:
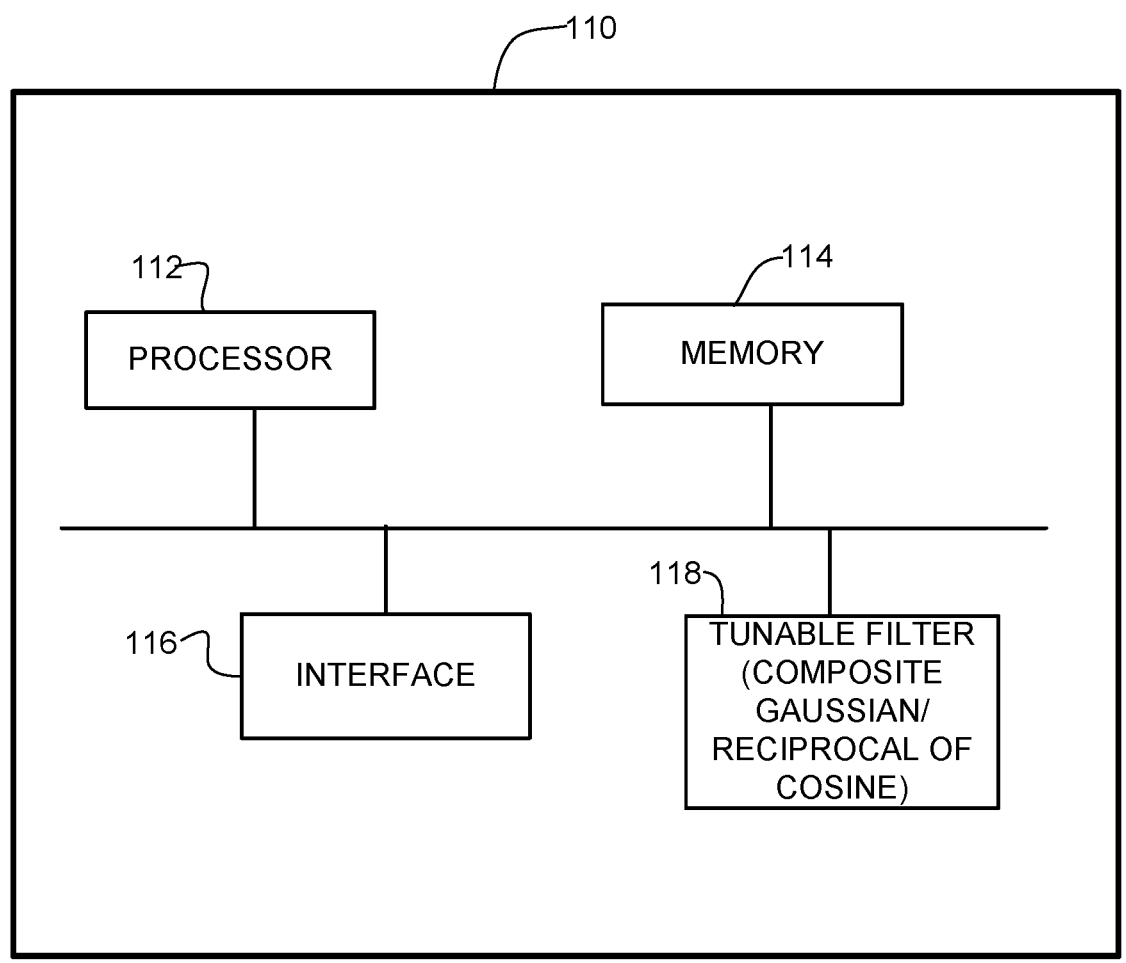
FIG. 11 depicts an example of a network device useful in implementing embodiments described herein.

FIG. 11 illustrates an example of a network device 110 that may implement the embodiments described herein. In one embodiment, the network device 110 is a programmable machine that may be implemented in hardware, software, or any combination thereof. The network device 100 includes one or more processor 112, memory 114, network interface (port) 116, and tunable filter (e.g., code, software, logic, device) 118.

Memory 114 may be a volatile memory or non-volatile storage, which stores various applications, operating systems, modules, and data for execution and use by the processor 112. The network device 110 may include any number of memory components. In one or more embodiments, one or more components of the filter 118 may be stored in memory 114.

Logic may be encoded in one or more tangible media for execution by the processor 112. For example, the processor 112 may execute codes stored in a computer-readable medium such as memory 114. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 110 may include any number of processors 112.

The network interface 116 may comprise any number of interfaces (linecards, ports) for receiving data or transmitting data to other devices. The network interface 116 may include, for example, an Ethernet interface or optical interface for connection to a computer or network.

It is to be understood that the network device 110 shown in FIG. 11 and described above is only an example and that different configurations of network devices may be used. For example, the network device 110 may further include any suitable combination of hardware, software, algorithms, processors, devices, components, or elements operable to facilitate the capabilities described herein.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A transmission system comprising:
a transmitter;
a receiver; and
a filter operable at one of the transmitter and the receiver to remove channel impairments;
the filter operable according to a sum of a Gaussian function and a reciprocal of cosine function, wherein said Gaussian function and said reciprocal of cosine function comprise tunable parameters to account for skew and channel asymmetry.

2. The transmission system of claim 1 wherein the skew comprises time delay skew, rise and fall time skew, and amplitude skew.

3. The transmission system of claim 1 wherein the filter comprises a band pass filter with shaping for use in equalization.

4. The transmission system of claim 1 wherein said tunable parameters comprise frequency, a Gaussian variable, a standard deviation variable, and a skew variable.

5. The transmission system of claim 1 wherein the sum of said Gaussian function and said reciprocal of cosine function is defined as:

$$T = \sum_{i=1}^{n} \frac{1}{\sqrt{2\pi\mu_i}} e^{-\frac{1}{2}\left(\frac{f-f_i^0}{\sigma_i}\right)^2} + \frac{1}{|\cos(\pi t_{skew} f)|};$$

wherein f is a frequency, $f_i^o$ is a tunable frequency parameter; $\sigma_i$ is a tunable Gaussian variable, $\mu_i$ is a tunable standard deviation variable of said Gaussian function, and $t_{skew}$ is a tunable skew parameter.

6. The transmission of system of claim 1 wherein at least some of said tunable parameters are defined based on an impulse response at the receiver.

7. The transmission system of claim 1 wherein the filter operates at the receiver.

8. The transmission system of claim 1 wherein the filter operates at the transmitter.

9. The transmission system of claim 1 wherein the transmission system operates in a pulse amplitude modulation serializer/deserializer and the transmission system further comprises a continuous time linear equalizer located after the filter.

10. A method comprising:
receiving at a receiver, a transmission signal from a transmitter;
filtering the data with a composite Gaussian and reciprocal of cosine filter to remove channel impairments; and
tuning tunable parameters of the composite Gaussian and reciprocal of cosine filter to account for skew and channel asymmetry.

11. The method of claim 10 wherein the skew comprises time delay skew, rise and fall time skew, and amplitude skew.

12. The method of claim 10 wherein the composite Gaussian and reciprocal of cosine filter comprises a band pass filter with shaping for use in equalization.

13. The method of claim 10 wherein said tunable parameters comprise frequency, a Gaussian variable, a standard deviation variable, and a skew variable, and wherein said tunable parameters are defined based on insertion loss deviation.

14. The method of claim 10 wherein Gaussian and reciprocal of cosine functions of the composite Gaussian and reciprocal of cosine filter operate according to:

$$T = \sum_{i=1}^{n} \frac{1}{\sqrt{2\pi}\mu_i} e^{-\frac{1}{2}\left(\frac{f-f_i^0}{\sigma_i}\right)^2} + \frac{1}{|\cos(\pi t_{skew} f)|};$$

wherein f is a frequency, $f_i^o$ is a tunable frequency parameter; $\sigma_i$ is a tunable Gaussian variable, $\mu_i$ is a tunable standard deviation variable of said Gaussian function, and $t_{skew}$ is a tunable skew parameter.

15. The method of claim 10 wherein at least some of said tunable parameters are defined based on an impulse response at the receiver.

16. A method comprising:
receiving transmission data at a transmitter;
filtering the transmission data with a composite Gaussian and reciprocal of cosine filter to remove channel impairments;
tuning tunable parameters of the composite Gaussian and reciprocal of cosine filter to account for skew;
generating a transmission signal; and
transmitting the transmission signal to a receiver.

17. The method of claim 16 wherein the skew comprises time delay skew, rise and fall time skew, and amplitude skew.

18. The method of claim 16 wherein the composite Gaussian and reciprocal of cosine filter comprises a band pass filter with shaping for use in equalization.

19. The method of claim 16 wherein said tunable parameters comprise frequency, a Gaussian variable, a standard deviation variable, and a skew variable.

20. The method of claim 16 wherein the composite Gaussian and reciprocal of cosine filter operates in combination with a continuous time linear equalizer.

* * * * *